May 27, 1924.

H. J. VAN DER BIJL 1,495,279

PRESSURE CONTROL FOR GASEOUS DISCHARGE DEVICES

Filed Aug. 7, 1920

Inventor:
Hendrik J. van der Bijl.
by W. E. Beatty, Atty.

Patented May 27, 1924.

1,495,279

UNITED STATES PATENT OFFICE.

HENDRIK J. VAN DER BIJL, OF NEW YORK, N. Y., ASSIGNOR TO WESTERN ELECTRIC COMPANY, INCORPORATED, OF NEW YORK, N. Y., A CORPORATION OF NEW YORK.

PRESSURE CONTROL FOR GASEOUS DISCHARGE DEVICES.

Application filed August 7, 1920. Serial No. 401,858.

*To all whom it may concern:*

Be it known that I, HENDRIK J. VAN DER BIJL, a subject of the King of Great Britain, residing at New York, in the county of New York, State of New York, have invented certain new and useful Improvements in Pressure Controls for Gaseous Discharge Devices, of which the following is a full, clear, concise, and exact description.

This invention relates to a gaseous discharge device in which two or more electrodes are immersed in a gas or vapor at a suitable pressure in a container. It has for its object to provide an improved means for controlling the gas pressure in the container.

For this purpose, a substance capable of emitting gas when heated and absorbing gas when cooled, is placed within the container, preferably in the form of a conductor which may be heated by the passage of current, and the temperature of this substance is controlled in response to changes of current flowing in one of the electrode circuits of the device. Preferably, a resistance is placed in an electrode circuit, for example, the grid-cathode circuit of the device used as an amplifier and the variations in potential difference across the terminals of this resistance are amplified by a vacuum tube amplifier and the output current of the amplifier is employed to variably heat the conductor or to control an auxiliary circuit containing a source of heating current.

For the purpose of illustration, a three-electrode gaseous discharge device is disclosed herein having the gas pressure regulating means connected to the input circuit. It is obvious, however, that certain features of the invention are of broader application and that the invention is entitled to the use of equivalents within the scope of the appended claims.

Figure 1:
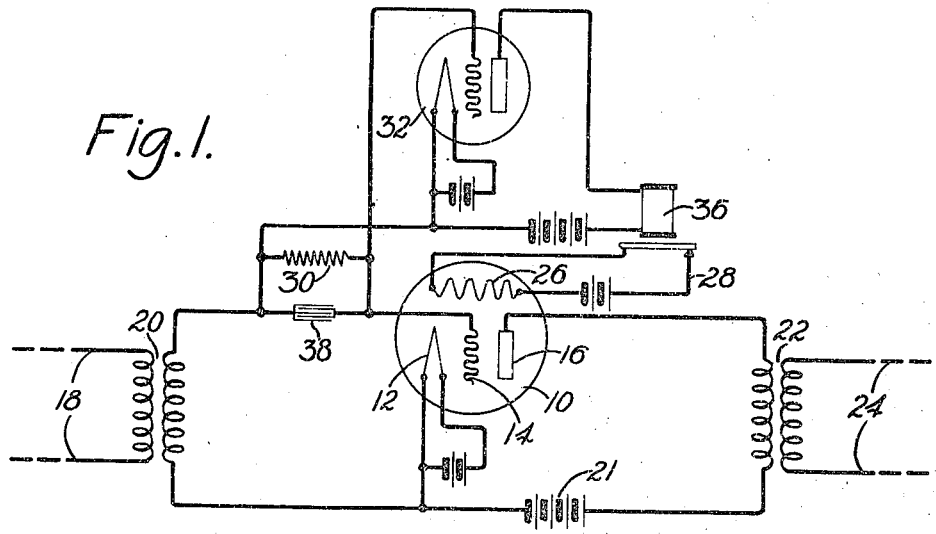
Figure 2:
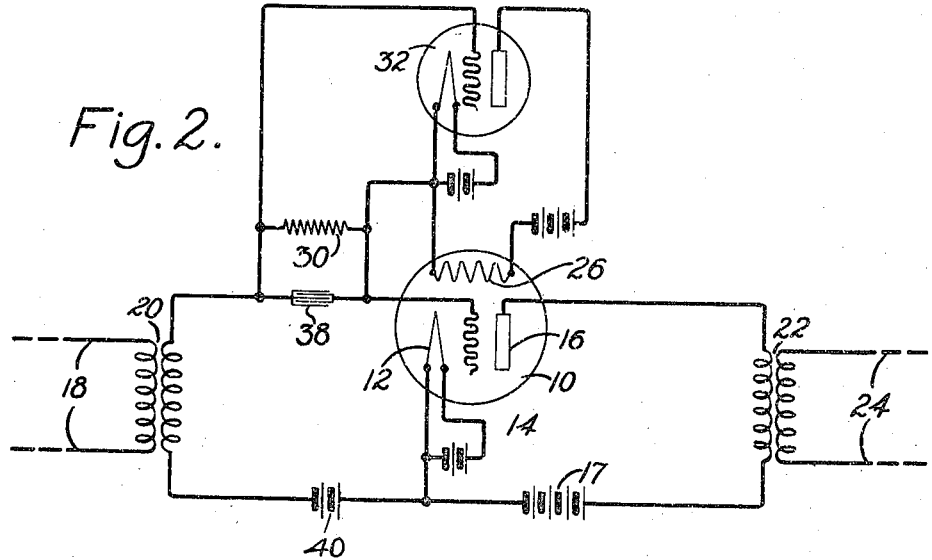

Figure 1 represents diagrammatically the discharge device employing the invention, in which an auxiliary heating circuit is used. Fig. 2 represents a modification in which the gas regulating means is heated directly by the output current of a vacuum tube.

Referring to the drawings by reference characters, the envelope 10 may be filled with any suitable gas or vapor, preferably with an inert gas such as argon or helium, and contains a cathode 12, shown as a thermionic filament, a grid or control electrode 14, and an anode 16. Impulses from a suitable source connected to line 18 may be impressed to transformer 20 on the cathode and control electrodes. These impulses appear in amplified form in the output circuit, which is energized by the source of current 21, and through transformer 22 and line 24 may be impressed on any suitable work circuit or other device. For some purposes such as, for example, radio detection, the presence of a certain amount of gas or vapor is conducive to increasing the efficiency over that obtained in very high vacuum. When there is gas present, it is necessary, however, to maintain the gas pressure approximately constant in order that the operation of the device may be stable. For this purpose there is employed a substance, for example carbon, preferably incorporated in a filament or conductor 26, which is capable of absorbing the gas with which the device is filled when cooled and emitting this gas when heated. In Fig. 1 a heating circuit 28 is shown, in which the conductor 26 is comprised. A resistance 30 is placed in the direct current path between electrode 14 and the other electrodes. The ends of resistance 30 are connected to the input electrodes of an ordinary vacuum tube amplifier 32, which, in the arrangement shown in Fig. 1, has in its output a marginal relay 36 adapted to open the heating circuit 28. A condenser 38 may be placed in shunt to resistance 30 to provide an easy path for alternating currents.

The operation of the circuit is as follows: If heating circuit 28 is closed as shown, as soon as too much gas is evolved from conductor 26 a greater amount of ionization will take place in the tube and a greater number of positive ions will flow to the grid, thus increasing the current through the resistance 30. It will be noted that most of the ionization takes place between the grid and anode and that, therefore, the positive ions flow to the grid 14 rather than to the cathode 12, the grid being at the same potential as the negative terminal of the cathode. The positive end of resistance 30 being connected to the grid of amplifier 32, this grid of 32 will become more positive with respect to the cathodes of tube 32. This will result in an increased output current through the relay 36 and circuit 28 will be opened. Conductor 26 will be cooled and will re-absorb gas until the desired impedance is obtained within the tube 10. If the impedance in the tube 10 becomes too great, current through resistance 30 will decrease, the output current through relay 36 will decrease, and close the heating circuit 28.

The circuit shown in Figure 2 is similar to that in Figure 1 except that conductor 26 is connected in series in the output circuit of amplifier 32. In this arrangement, the grid of amplifier 32 is connected to the negative end of resistance 30, so that an increase of current therethrough will produce a decrease of current in the output circuit. Otherwise the operation is substantially as described above. If desired a battery 40 may be employed to give the grid a potential different from that of the cathode. Preferably the grid should not be more positive than the average potential of the cathode. The grid of amplifier 32 may, of course, be assigned any desired potential with reference to its corresponding cathode in a manner well understood in the art.

While in the circuits herein disclosed the input of amplifier 32 has been shown connected to a resistance in the input circuit of device 10, it is obvious that it might be connected so as to be responsive to changes in current in other electrode circuits of discharge device.

What is claimed is:

1. A gaseous discharge device, an electrode circuit therefor, a vacuum tube amplifier having its input connected to said circuit, and means responsive to the output current of said amplifier for controlling the gas pressure in said device.

2. A gaseous discharge device, an electrode circuit therefor, a resistance in said circuit, and means responsive to changes in potential drop across said resistance for controlling the gas pressure in said device.

3. A gaseous discharge device, an electrode circuit therefor, a resistance in said circuit, a path of low impedance to alternating currents in shunt to said resistance, and means responsive to changes in potential drop across said resistance for controlling the gas pressure in said device.

4. A gaseous discharge device, an electrode circuit therefor, an impedance in said circuit, a vacuum tube amplifier having its input electrodes connected to the terminals of said impedance, and means responsive to the output current of said amplifier for controlling the gas pressure in said device.

5. A gaseous discharge device, a substance therein emitting or absorbing gas as its temperature is raised or lowered, and a vacuum tube amplifier for controlling the temperature of said substance.

6. A gaseous discharge device, a conductor therein comprising a substance emitting or absorbing gas as its temperature is raised or lowered, and a vacuum tube amplifier including said conductor in its output circuit.

7. A gaseous discharge device, a conductor therein comprising a substance emitting or absorbing gas as its temperature is raised or lowered, and a vacuum tube amplifier including said conductor in its output circuit, said amplifier being responsive to changes in an electrical characteristic of said device.

8. A gaseous discharge translating device having cathode, anode and control electrodes, an input circuit connected to said cathode and control electrodes, a resistance in said input circuit, temperature regulated means for controlling the gas pressure in said device, a source of current for regulating said means, and means for varying said current in response to changes in voltage across said resistance.

9. A gaseous discharge translating device having cathode, anode and control electrodes, an input circuit connected to said cathode and control electrodes, a resistance in said input circuit, a vacuum tube amplifier having its input electrodes connected to the terminals of said resistance, temperature regulated means for controlling the gas pressure in said device, and means in the output of said amplifier for varying the temperature of said controlling means.

10. A gaseous discharge translating device having cathode, anode and control electrodes, an input circuit connected to said cathode and control electrodes, a resistance in said input circuit, a vacuum tube amplifier having its electrodes connected to the terminals of said resistance, a conductor in said device comprising a substance emitting or absorbing gas as its temperature is raised or lowered, said conductor being in series in the output circuit of said amplifier.

In witness whereof, I hereunto subscribe my name this 30th day of July, A. D., 1920.

HENDRIK J. van der BIJL.